Oct. 13, 1936.  B. C. PLACE  2,057,588
SECURING TRIM MATERIAL
Original Filed June 20, 1930
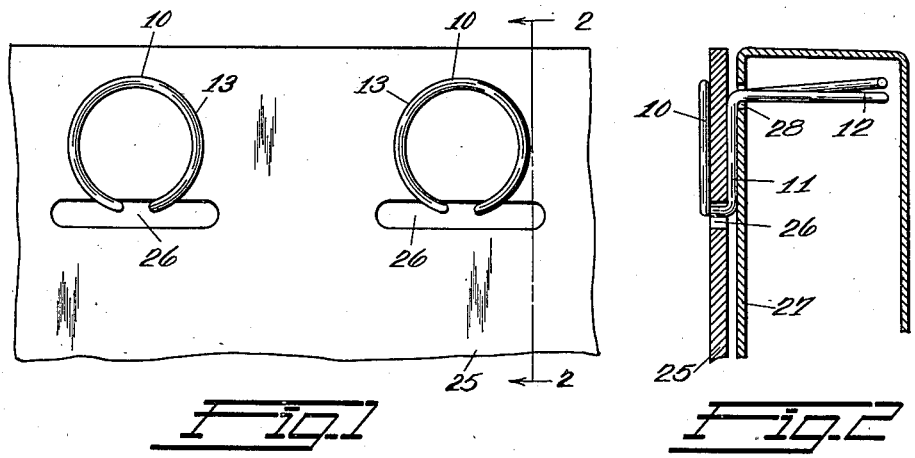
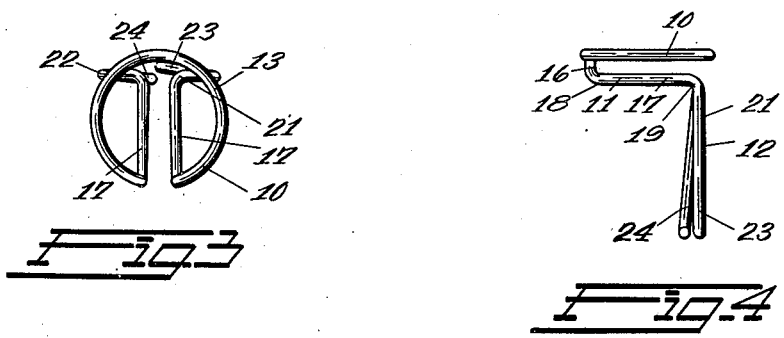
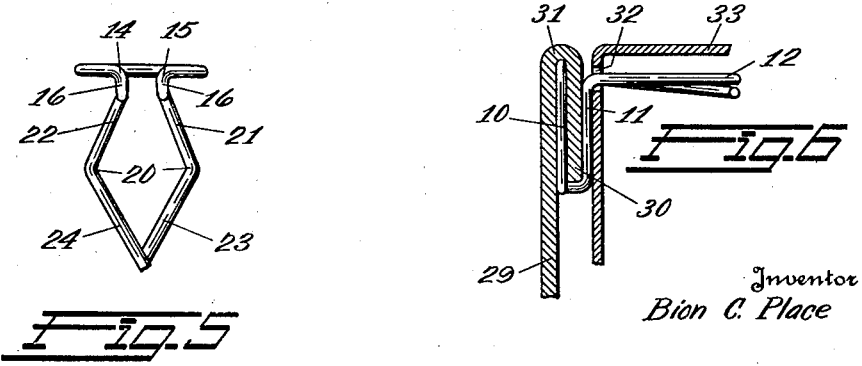
Inventor
Bion C. Place Patented Oct. 13, 1936

2,057,588

UNITED STATES PATENT OFFICE 2,057,588

SECURING TRIM MATERIAL

Bion C. Place, Detroit, Mich., assignor of one-half to George E. Gagnier, Detroit, Mich.

Original application June 20, 1930, Serial No. 462,633. Divided and this application October 19, 1931, Serial No. 569,800

5 Claims. (Cl. 45—138)

This invention relates to the securing of trim or covering material by spring or snap fasteners, preferably of the one-piece type. This invention is particularly adapted for securing trim material to the inside of automobile bodies, though it should be understood that the invention is capable of being put to many other uses.

It is frequently desirable to attach snap fasteners to the material that is to be secured by them to a supporting structure of any kind. This is to enable the material to which the fasteners are attached to be readily applied to the supporting structure by simply bringing the fasteners into registry with the sockets or apertures, provided in the supporting structure to receive them, and applying pressure to cause the fasteners to snap into holding position.

Fasteners have been proposed that were assembled with respect to the covering material by passing the shanks thereof through openings in the covering material provided to receive them. Such arrangement is sometimes not entirely satisfactory if the holes in the covering material have to be formed very near to the edges thereof in order that the fastener may be located in a position close to the edges of the material, as is frequently desirable.

When the covering material consists of panels, each including a body and a cloth covering for one face, such as are customarily employed to finish the interior of automobile bodies, it is desirable to attach the fasteners to the panel, after the covering material has been applied to the front face thereof. This can be accomplished by forming specially formed slots in the body of the panel as described in my patent #1,722,944, granted July 30, 1929.

This invention aims to improve upon the construction disclosed in the patent just referred to, by providing a fastener that can be associated with the covering material so that parts of the fastener serve to firmly grip said covering material and pass therethrough at a point substantially out of alignment with the shank of the fastener, to the end that the perforation of the covering material may be made relatively small and at a point spaced from the edge of the covering material, although the gripping portion of the fastener may exert its holding function immediately adjacent the edge of the covering material.

This invention, in its preferred embodiment utilizes a fastener having some of the characteristics of the fastener disclosed in my Patent #1,679,266 granted July 31st, 1928. The present invention however constitutes an improvement on that of said patent by disposing the arms that connect the head of the fastener and the shank, so that said arms may cooperate with the under-side of the head to provide jaws between which the covering material may be gripped.

This invention also presents an improved combination over that disclosed in said patent by disposing the shank of the fastener adjacent the edge of the head thereof, at a point substantially spaced from the point at which the arms of the fastener are connected to the loop, constituting the head thereof, to the end that the shank is substantially spaced with respect to the portions of the fastener that connect said arms and said head, so that the opening in the covering material through which the fastener passes, if an opening is made, may be disposed substantially to one side of the opening in the supporting structure that receives the shank of the fastener when it is in operative position.

In using snap fasteners assembled with respect to the panel as above described, it is frequently desirable to be able to shift the fastener laterally to bring it exactly opposite the socket openings in the supporting structure provided to receive it. Relatively complex multi-part sheet metal constructions have been heretofore proposed, to enable this to be brought about. By the use of the present invention it is only necessary to provide a relatively narrow opening of elongated or equivalent form to enable the fastener to be shifted laterally along the length of said slot in order to bring it into proper position for assembly with respect to the socket in the supporting structure to which it is to be applied, the fastener of the present inventio: gripping the portions of the covering material adjacent said elongated slot frictionally, which permits the fastener to be slidably shifted in bringing it into position. Or, the fastener may simply slidably grip the edge, inturned or otherwise, of the covering material thus avoiding perforation of such material.

The primary object of the invention accordingly is, to provide a trim panel assembly including a one-piece wire spring fastener that may be readily assembled with respect to the covering material, without necessitating the perforation of the covering material immediately adjacent the edges thereof, or without necessitating the formation of slots of irregular form, the latter requiring special dies to punch them in the covering material.

A still further object of the invention is to provide a trim panel assembly including a one-piece wire spring fastener, of the snap type, that may be readily assembled with respect to the covering material by inserting the same in a straight slot from the rear face of the covering material, if desired, and that is so formed as to frictionally grip the covering material at the portion thereof adjacent the slot through which the fastener passes.

A still further object of the invention is to provide trim panel assembly including a snap fastener of the one-piece wire type, that may be assembled with respect to covering material so as to grip the same, and that may, at the same time be adjusted so as to provide substantial variation in the point of its location, without seriously weakening the covering material by forming relatively large openings therein to enable this to be brought about.

A further object of the invention is to provide a snap fastener that may be assembled with respect to a panel through a narrow straight elongated slot that may be formed in the covering material at a point substantially spaced from the edge thereof by means of ordinary rule dies, that may be inexpensively made and operated at a low labor cost.

This application is a division of my copending application Serial No. 462,633, filed June 20, 1930.

Further objects of the invention will appear as a description thereof proceeds with references to the accompanying drawing in which—

Figure 1 is a fragmentary front view of covering material applied to a supporting structure in accordance with the present invention.

Figure 2 is a transverse sectional view, taken in the plane indicated by the line 2—2 in Figure 1 looking in the direction of the arrows.

Figure 3 is a plan view of a preferred form of fastener used in this invention.

Figure 4 is a side elevation of the fastener as seen from the right of Figure 3.

Figure 5 is a side elevation of the fastener as viewed from the left of Figure 4.

Figure 6 is a sectional view showing a modification of the invention requiring no perforation of the covering material.

Like reference characters indicate like parts throughout the several figures.

The fastener forming an essential part of this invention is preferably constructed from a single piece of spring wire, and, in its final form, comprises a head 10, means 11 arranged to cooperate with the underside of the head of the fastener to grip material, to be held in place by said fastener, between the head and said means, and a shank 12 extending in a plane approximately at right angles to the plane of said head and said means. The mid-portion of the wire is bent to form the head 10 and the means 11 while the shank 12 of the fastener is formed by the ends of the wire.

Preferably, the head 10 is formed by bending the central portion into the form of an open loop 13 of any suitable form, although preferably circular as illustrated in the drawing in order to avoid unnecessary sharp bends. The portion of the wire immediately adjacent the ends of the loop 13 are bent downwardly approximately at right angles to the plane of the loop as indicated at 14 and 15 (Figure 5) providing relatively short legs 16. Such legs are made of a length corresponding approximately to the thickness of the material that is to be attached by the fastener, or, preferably, a little less than the thickness of said material, so that a firm frictional grip may be provided between the head 13 and the arms 17 that are formed by bending the portions of the wire adjacent the lower ends of the legs 16 at the points indicated at 18.

The legs 16 and the arms 17 constitute the means 11 that cooperate with the underside of the head 10 to grip the material to be held by said fastener between the head and the means in the manner more fully, hereinafter pointed out. The arms 17 may be carried substantially parallel to the plane of said head, a distance slightly less than the diameter of the head so that the shank 12 of the fastener is spaced substantially laterally of the legs 16 which pass through the openings in the material in a manner hereinafter described.

The shank of the fastener includes the two ends of the wire formed by bending the wire substantially at right angles to the legs 17, as indicated at 19. Said ends are bowed between the tips thereof and the bends 19, as illustrated at 20, the arrangement providing divergently disposed holding elements 21 and 22, and convergently disposed guiding elements 23 and 24. The tips of the wire may be disposed in overlapped relation as shown so that the fastener may readily be entered in an opening or socket designed to receive it.

The fastener just described is particularly designed for securing the trim panels of automobile or similar bodies in position with respect to the supporting structure of the body. When so used the fastener is applied in the manner illustrated in Figures 1 and 2 of the drawing, in which the numeral 25 designates a fragment of the body of a trim panel. Such bodies are usually constructed of fibrous material such as cardboard or paper reinforced with steel, or of any other relatively stiff material. Such panels are usually attached by applying fasteners thereto adjacent the edges thereof at spaced intervals along said edges, since it is desirable in order that the panel may be firmly held against the inside of the body that the panel be secured as close to the edges thereof as feasible. By using fasteners such as just described, the body need not be perforated close to the edge of the panel although the holding elements of the fastener may be located close to the edge of the body of the panel.

In order to permit ready assembly of the fasteners with respect to the body, said body is provided with relatively narrow elongated slots 26 disposed at intervals along the edges thereof at some distance spaced inwardly from the extreme edges. Such slots, in view of the fact that they are spaced substantially inwardly from the edge of the panel and in view of the further fact that they are of relatively narrow width, do not materially weaken the panel. The fasteners are applied to the panels by inserting the closed portion of the loop 13 through the slot 26 and tilting the fastener slightly to enable this to be brought about. The loop 13 is then moved over the top surface of the body, while at the same time the arms 17 move over the under surface of the panel so that the panel is firmly gripped between the arms 17 and the loop 13. As above pointed out, the arms 17 are spaced from the heads 10 just sufficient so that the body 25 is frictionally, but firmly, gripped between said arms and said head when the fastener has been assembled with respect to the body of the panel in the manner just described.

It will be observed that, since the slot 26 is elongated sufficiently to permit the bowed portions 20 of the shank of the fastener to pass freely therethrough, after the fasteners have been assembled with respect to the body, they are capable of being shifted laterally along the length of the slot so as to vary their position somewhat in order to enable the shanks of the fastener to be brought exactly opposite the openings or sockets that are intended to receive them. Circular or openings of other form may be used as will be obvious.

The outer face of the body 25 of the trim panel may be covered by a cloth covering, of any desired character. Such covering may be applied to the panel before the fasteners are assembled with respect thereto by lapping the edges of the fabric around the edges of the body 25 and by stitching the fabric thereto in a manner well known in the art. The fasteners may be applied to such a covered panel in which event the heads 10 will be disposed when the fasteners are in position, between the cloth covering and the outer side of the body 25.

After the fasteners have been assembled with respect to the panel the panel is applied to the inside of the body by causing the shanks 12 of the fasteners to enter pre-formed perforations or sockets in the supporting structure. A fragment of such supporting structure is designated by numeral 27 in Figure 2, and such structure is provided, at intervals corresponding to the spacing of the fasteners in the panels, with perforations 28. The perforations 28 may be disposed close to the edges of the supporting structure as illustrated, that is, in a position substantially spaced laterally of the elongated slots 26 in the body of the panel.

The panel is then applied to the supporting structure by inserting the shanks of the fasteners in the openings 28 and applying pressure along the length of said shanks. This action causes the guiding portions 23 and 24 to wedge the holding portions 21 and 22 toward each other permitting the widest portion of the fastener to pass through the opening 28. After this has been accomplished the holding portions 21 and 22 spread apart, and as the panel is forced against the supporting structure, said holding portions firmly grip the edges of the openings or perforations 28, holding the panel in position by a wedging action that tends to draw the panel toward the supporting structure. It will be observed that the wedging action just referred to is effective immediately adjacent the edges of the panels although the fasteners do not pass through the panels at this point. The fastener of this invention accordingly secures the panels with respect to the supporting structure as effectively as if the fasteners had traversed the panels immediately adjacent the edges thereof, although this result is accomplished by this invention without weakening the panels, as would be necessary to bring this about with the ordinary form of fastener.

While the construction just described represents the present preferred manner of utilizing the invention, it will be readily understood that the described invention is capable of being used in many other relations and that the fastener forming a part thereof may be applied to the edges of the panels without perforating them by simply entering said edges between the arms 17 and the loop 13 so that the fastener is frictionally retained with respect to said edges.

A construction of the latter type in which the fastener is concealed is shown in Fig. 6, in which the covering material 29 is imperforated. The margins of said material are folded inwardly at 30 forming a nicely-rounded, neat-appearing edge 31 spaced from the inner surface of the material, which may be a cloth covered panel or a section of an externally ornamented or unornamented metallic or fibrous material. The improved snap fasteners are simply applied at intervals along the folded edges by causing said edge to enter between the head 10 of the fastener and the means 11 thereof that cooperates with the underside of said head to form jaws which frictionally grip said edge, though the fasteners may be slid along the edge to bring them into proper position. The covering material or panel is applied as above described with reference to Figure 2 by simply causing the shank 12 of each fastener to enter an opening or socket 32 in the supporting structure 33.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What I claim and desire to secure by United States Letters Patent is:

1. In combination, a perforated supporting member, a trim panel of relatively stiff material for said supporting member, said trim panel being provided with a relatively small opening disposed in offset relation to the perforation in said supporting member; and a spring fastener for attaching said covering material to said supporting member, comprising a head substantially longer than the width of said opening and bearing on one side of said covering material and means extending through said opening and bearing against the other side of said covering material, said head and means being formed so that said material is frictionally gripped between said head and said means, and elements integrally attached to said means and extending through the perforation in said supporting member to hold said material resiliently in fixed relation thereto.

2. In combination, a supporting structure a portion of which is to be covered by a trim panel, fastener receiving openings in said supporting structure close to the edges of said portion, a trim panel of relatively stiff material extending to said edges, and snap fasteners having a head in the form of a hook engaged on said panel with the bight of the hook spaced substantially inwardly of the covering material margins and of said openings, and an expansible and contractible shank presenting holding surfaces engaging the walls of and extending through said fastener receiving openings in the supporting structure.

3. In combination, a perforated supporting member, a trim panel of relatively stiff material provided with a fastener opening disposed in lapped relation on said supporting member, and a spring fastener for attaching said trim panel to said supporting member, comprising a head bearing on one side of said panel to an extent exceeding the width of said opening and means extending through the opening in said panel and bearing against the other side thereof to an extent exceeding the width of said opening so that said panel is frictionally gripped between said head and said means over a relatively wide area but so as to be capable of adjustment insofar as permitted by the size of the opening, and resilient elements engaged in the perforation of said supporting member to hold said material in fixed relation thereto.

4. In combination, a supporting structure presenting an area for covering with a trim panel, fastener receiving openings close to the margins of said area, a trim panel of relatively stiff material to cover said area, and snap fasteners having U-shaped heads hooked on said panel toward the margins thereof and having shanks to enter said openings, said shanks being substantially offset laterally of the bights of the hooks of the fasteners.

5. The combination with a metallic supporting structure having a stud-receiving aperture therein of fixed size, a trim panel superposed upon said supporting structure and having a relatively thin cardboard and the like foundation provided with an aperture located at a greater distance from the edge than the aperture in the supporting structure, thereby leaving an imperforate portion of the foundation between the edge and the aperture of sufficient strength to prevent breaking and tearing under normal use, and a snap fastener stud member having a yieldable portion entered into the aperture in the supporting structure and also having an attaching portion passing through the aperture in the foundation and bearing against the outer face to press the foundation against the supporting structure and to hold the fastener stud in position relative to the foundation.

BION C. PLACE.